(12) United States Patent
Matsuda et al.

(10) Patent No.: US 10,479,710 B2
(45) Date of Patent: Nov. 19, 2019

(54) GRANULE-FORMING METHOD AND WASTE WATER TREATMENT METHOD

(71) Applicant: ORGANO CORPORATION, Tokyo (JP)

(72) Inventors: Hatsuhiro Matsuda, Tokyo (JP); Masaaki Tomita, Tokyo (JP); Aki Hamamoto, Tokyo (JP); Masaki Miyake, Tokyo (JP); Yoshiaki Hasebe, Tokyo (JP); Masahiro Eguchi, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 0 days.

(21) Appl. No.: 16/069,083

(22) PCT Filed: Dec. 28, 2016

(86) PCT No.: PCT/JP2016/089167
§ 371 (c)(1),
(2) Date: Jul. 10, 2018

(87) PCT Pub. No.: WO2017/122547
PCT Pub. Date: Jul. 20, 2017

(65) Prior Publication Data
US 2019/0023594 A1     Jan. 24, 2019

(30) Foreign Application Priority Data
Jan. 12, 2016  (JP) ................. 2016-003894

(51) Int. Cl.
*C02F 3/12*  (2006.01)
*C02F 3/00*  (2006.01)
*C02F 3/10*  (2006.01)

(52) U.S. Cl.
CPC .............. *C02F 3/1263* (2013.01); *C02F 3/00* (2013.01); *C02F 3/10* (2013.01); *C02F 3/12* (2013.01);
(Continued)

(58) Field of Classification Search
CPC ............ C02F 2203/004; C02F 2209/08; C02F 2209/14; C02F 3/00; C02F 3/10; C02F 3/12; C02F 3/1263; Y02W 10/15
See application file for complete search history.

(56) References Cited

U.S. PATENT DOCUMENTS

2011/0186510 A1     8/2011  Whiteman

FOREIGN PATENT DOCUMENTS

| JP | 2002-248491 | 9/2002 |
|---|---|---|
| JP | 2007-136365 | 6/2007 |

(Continued)

OTHER PUBLICATIONS

Extended European Search Report issued in corresponding European Patent Application No. 16885147.5 dated Oct. 22, 2018.
(Continued)

*Primary Examiner* — Dirk R Bass
(74) *Attorney, Agent, or Firm* — Greenblum & Bernstein, P.L.C.

(57) ABSTRACT

A granule-forming method using a semi-batch reaction tank, wherein: operation cycles of a first operation cycle for performing a biological treatment step at a first sludge load and after the first operation cycle, a second operation cycle for performing the biological treatment step at a second sludge load are performed repeatedly; the first sludge load is set so that the soluble BOD concentration in the semi-batch reaction tank at the time of completion of the biological treatment step of the first operation cycle does not decrease to a threshold value or less; and the second sludge load is set (Continued)

so that the soluble BOD concentration in the semi-batch reaction tank at the time of completion of the biological treatment step of the second operation cycle is at or below the threshold value.

8 Claims, 6 Drawing Sheets

(52) U.S. Cl.
CPC .... *C02F 2203/004* (2013.01); *C02F 2209/08* (2013.01); *C02F 2209/14* (2013.01); *Y02W 10/15* (2015.05)

(56) References Cited

FOREIGN PATENT DOCUMENTS

| | | |
|---|---|---|
| JP | 2008-212878 | 9/2008 |
| JP | 4804888 | 8/2011 |
| JP | 4975541 | 7/2012 |
| JP | 2014-136188 | 7/2014 |
| WO | 2004/024638 | 3/2004 |
| WO | 2011/100089 | 8/2011 |
| WO | 2012/077381 | 6/2012 |

OTHER PUBLICATIONS

Bensheng Su et al: "Optimal cultivation and characteristics of aerobic granules with typical domestic sewage in an alternating anaerobic/aerobic sequencing batch reactor", Bioresource Technology, vol. 110, Jan. 30, 2012.

International Search Report in International Patent Application No. PCT/JP2016/089167, dated Mar. 7, 2017.

International Preliminary Report on Patentability in International Patent Application No. PCT/JP2016/089167, dated Jul. 17, 2018.

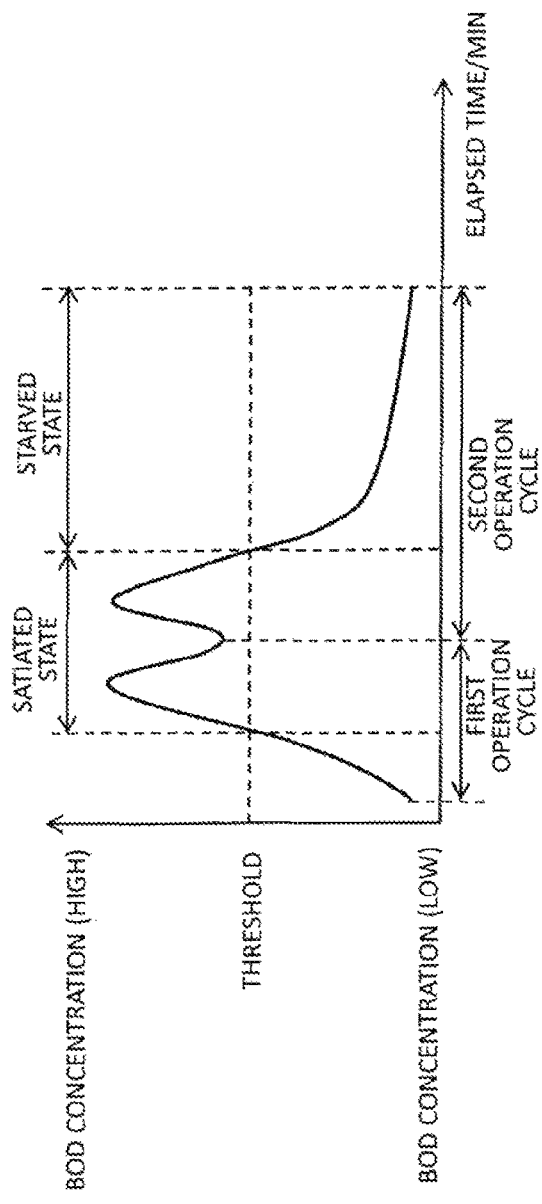
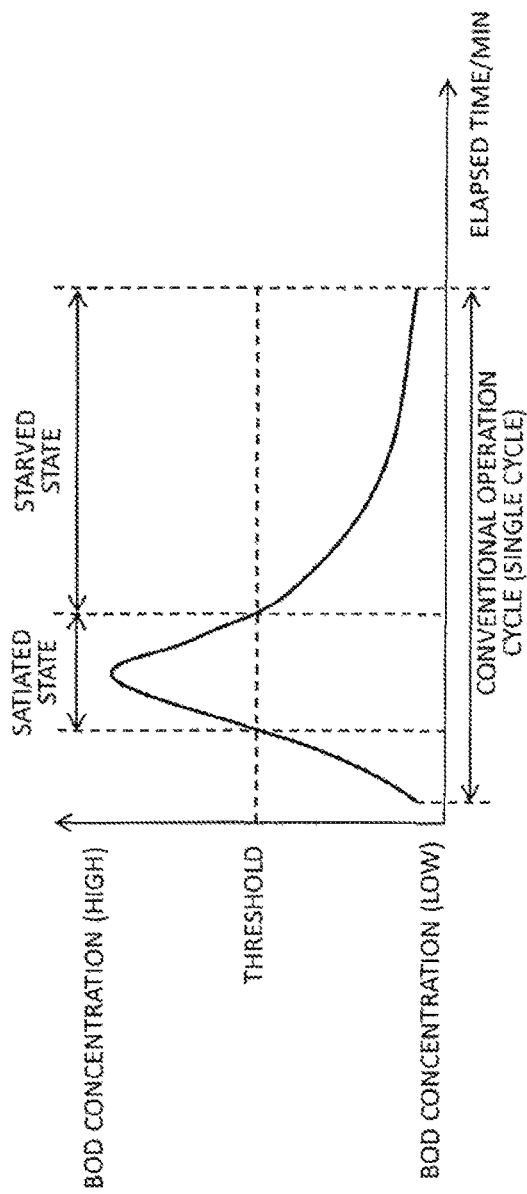
FIG. 3A
FIG. 3B

GRANULE-FORMING METHOD AND WASTE WATER TREATMENT METHOD

TECHNICAL FIELD

The present invention relates to technology for a granule-foiling method and a wastewater treatment method.

BACKGROUND

Conventionally, biological wastewater treatments of organic matter-containing wastewater, which contains organic matter or the like, have used the activated sludge method that utilizes an aggregate of microbes known as a floc (aerobic biological sludge). However, in the activated sludge method, when separating the floc (aerobic biological sludge) and the treated water in a settling pond, because the settling rate of the floc is slow the surface area of the settling pond must sometimes be made extremely large. Further, the treatment rate of the activated sludge method depends on the sludge concentration inside the biological treatment tank, and while the treatment rate can be increased by increasing the sludge concentration, if the sludge concentration is increased to a range from 1,500 to 5,000 mg/L or even higher, then solid-liquid separation becomes difficult due to bulking or the like within the settling pond, and the treatment cannot be maintained in some cases.

On the other hand, anaerobic biological treatments generally utilize aggregates in a particulate form known as granules (anaerobic biological sludge), which contain densely aggregated microbes. Granules have an extremely fast settling rate, and because the microbes are densely aggregated, the sludge concentration inside the biological treatment tank can be increased, and a high-speed treatment of the wastewater can be achieved. However, anaerobic biological treatments can suffer problems, including restrictions on the types of wastewater that can be treated compared with aerobic treatments (activated sludge method), and a requirement to hold the temperature of the treated water at approximately 30 to 35° C. Further, if only an anaerobic biological treatment is used, then the water quality of the treated water is poor, and when the treated water is to be discharged into a river or the like, a separate aerobic treatment such as the activated sludge method may sometimes be required.

In recent years, it has become clear that by using a semi-batch reaction tank that repeatedly carries out an operation cycle that includes (1) a wastewater introduction step, (2) a biological treatment step of the treatment target substances, (3) a biological sludge settling step, and (4) a treated water discharge step, granules having good settling properties can be formed not only with anaerobic biological sludges, but also with aerobic biological sludges (for example, see Patent Documents 1 to 4). By forming granules having good settling properties as described above, the sludge concentration inside the tank can be maintained at a high concentration, thereby enabling a high-speed treatment.

CITATION LIST

Patent Literature

Patent Document 1: WO 2004/024638
Patent Document 2: JP 2008-212878 A
Patent Document 3: JP 4975541 B
Patent Document 4: JP 4804888 B

SUMMARY

Technical Problem

In granule-forming methods using a semi-batch reaction tank, the creation of a satiated state (a state where the organic matter concentration inside the tank is high)/starved state (a state where the organic matter concentration inside the tank is low) in each operation cycle by forming an organic matter concentration gradient inside the tank is considered to be an important factor. However, for example, if the organic matter concentration in the wastewater is low (for example, a BOD of approximately 50 to 200 mg/L), such as in sewage and the like, because the organic matter is treated in a short period of time in the biological treatment step, it becomes difficult to form an adequate satiated state inside the tank. As a result, the formation of granules having good settling properties may sometimes become difficult.

Accordingly, an object of the present invention is to provide a granule-forming method using a semi-batch reaction tank, wherein the granule-forming method is capable of forming granules having good settling properties.

Solution to Problem (1) The present invention provides a granule-forming method using a semi-batch reaction tank, the method including forming granules by repeatedly performing an operation cycle having an introduction step of introducing an organic matter-containing wastewater, a biological treatment step of biologically treating treatment target substances in the organic matter-containing wastewater by using a microbiological sludge, a settling step of allowing the microbial sludge to settle, and a discharge step of discharging a biologically treated water that has been biologically treated, wherein the operation cycle includes a first operation cycle for performing the biological treatment step at a first sludge load, and a second operation cycle, performed after the first operation cycle, for performing the biological treatment step at a second sludge load, and the first sludge load is set such that a soluble BOD concentration inside the semi-batch reaction tank upon completion of the biological treatment step of the first operation cycle does not fall to a threshold value or below, and the second sludge load is set such that a soluble BOD concentration inside the semi-batch reaction tank upon completion of the biological treatment step of the second operation cycle does not exceed a threshold value.

(2) In the granule-forming method according to (1) above, a first sludge load/second sludge load ratio is preferably two times or more.

(3) In the granule-forming method according to (1) or (2) above, it is preferable that the second sludge load is set such that an ammoniacal nitrogen concentration inside the semi-batch reaction tank upon completion of the biological treatment step of the second operation cycle becomes 1 mgN/L or less.

(4) In the granule-forming method according to any one of (1) to (3) above, it is preferable that a biologically treated water outlet of the semi-batch reaction tank is provided above a wastewater inlet, and the biologically treated water is discharged from the treated water outlet by introducing the organic matter-containing wastewater into the semi-batch reaction tank from the wastewater inlet.

(5) The present invention also provides a wastewater treatment method using a continuous biological treatment tank that performs biological treatment of an organic matter-containing wastewater with a biological sludge while the wastewater is introduced continuously, the method comprising supplying granules formed by the granule-forming method according to any one of (1) to (4) above to the continuous biological treatment tank.

Advantageous Effects of Invention

The present invention enables granules having good settling properties to be formed by a granule-forming method using a semi-batch reaction tank.

BRIEF DESCRIPTION OF DRAWINGS

FIG. 3A is a diagram illustrating an example of a change over time in the soluble BOD concentration in a tank during the first operation cycle and the second operation cycle;

FIG. 3B is a diagram illustrating a change over time in the soluble BOD concentration inside a tank during a conventional operation cycle;

DESCRIPTION OF EMBODIMENTS

Embodiments of the present invention are described below. These embodiments are merely examples of implementing the present invention, and the present invention is in no way limited by these embodiments.

Figure 1:
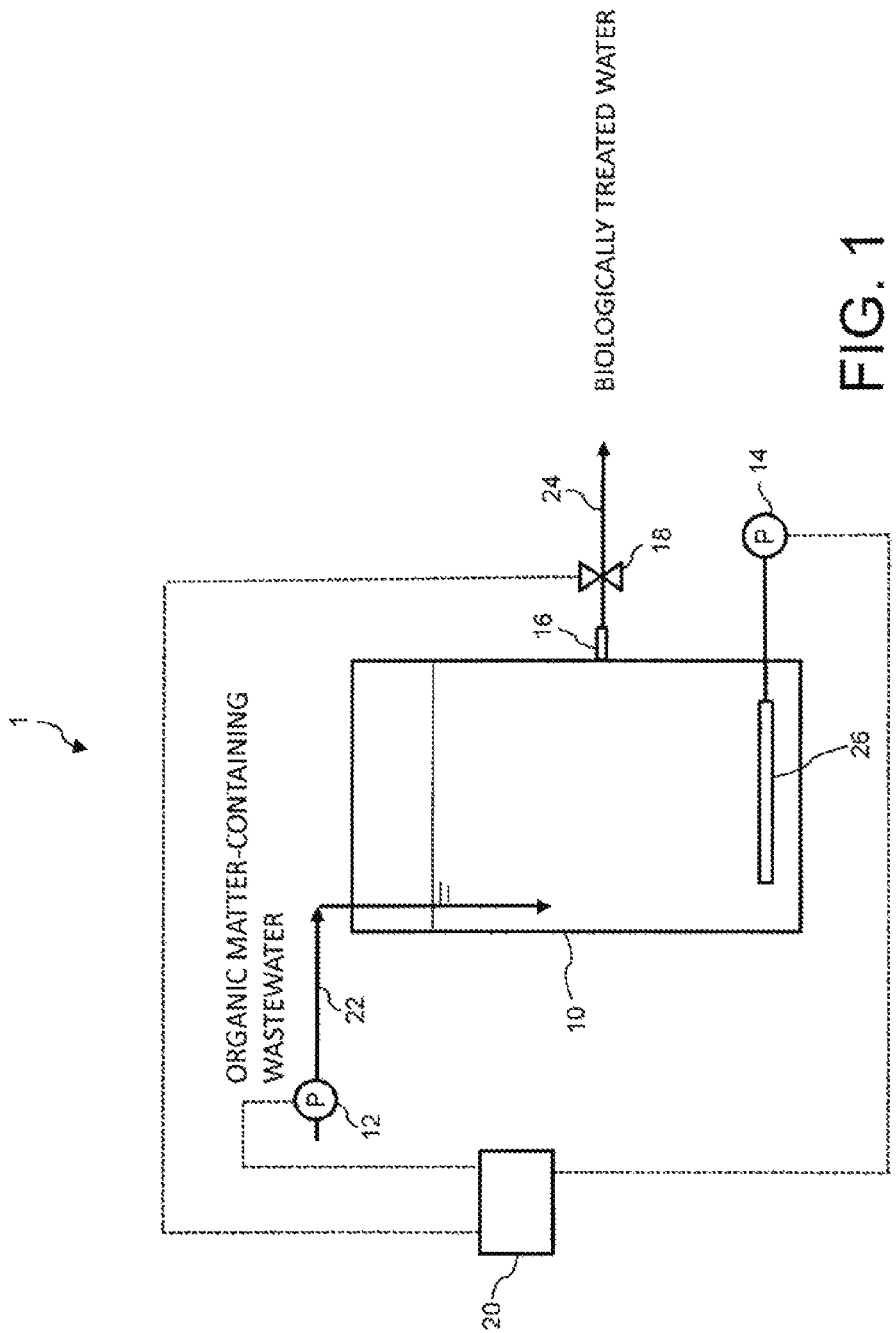
FIG. 1 is a schematic structural diagram illustrating an example of a granule-forming device according to an embodiment of the present invention.

An outline of an example of a granule-forming device according to an embodiment of the present invention is shown in FIG. 1, and the structure of that device is described below. The granule-forming device 1 is provided with a semi-batch reaction tank 10. In the granule-forming device 1, a wastewater supply line 22 is connected to a wastewater inlet of the semi-batch reaction tank 10 via a wastewater inlet pump 12. A biologically treated water line 24 is connected to a biologically treated water outlet 16 of the semi-batch reaction tank 10 via a biologically treated water discharge valve 18. An aeration device 26 connected to an aeration pump 14 is installed in a lower portion inside the semi-batch reaction tank 10. Further, the wastewater inlet pump 12, the biologically treated water discharge valve 18, and the aeration pump 14 are each electrically connected to a control device 20, and the control device 20 controls the activation and stopping of the pumps, and the opening and closing of the valve and the like.

The granule-forming device 1 is operated, for example, using the following operation cycle.

<(1) Introduction Step>

The wastewater inlet pump 12 is activated, and a predetermined amount of an organic matter-containing wastewater is introduced into the semi-batch reaction tank 10 through the wastewater supply line 22.

<(2) Biological Treatment Step>

Figure 2:
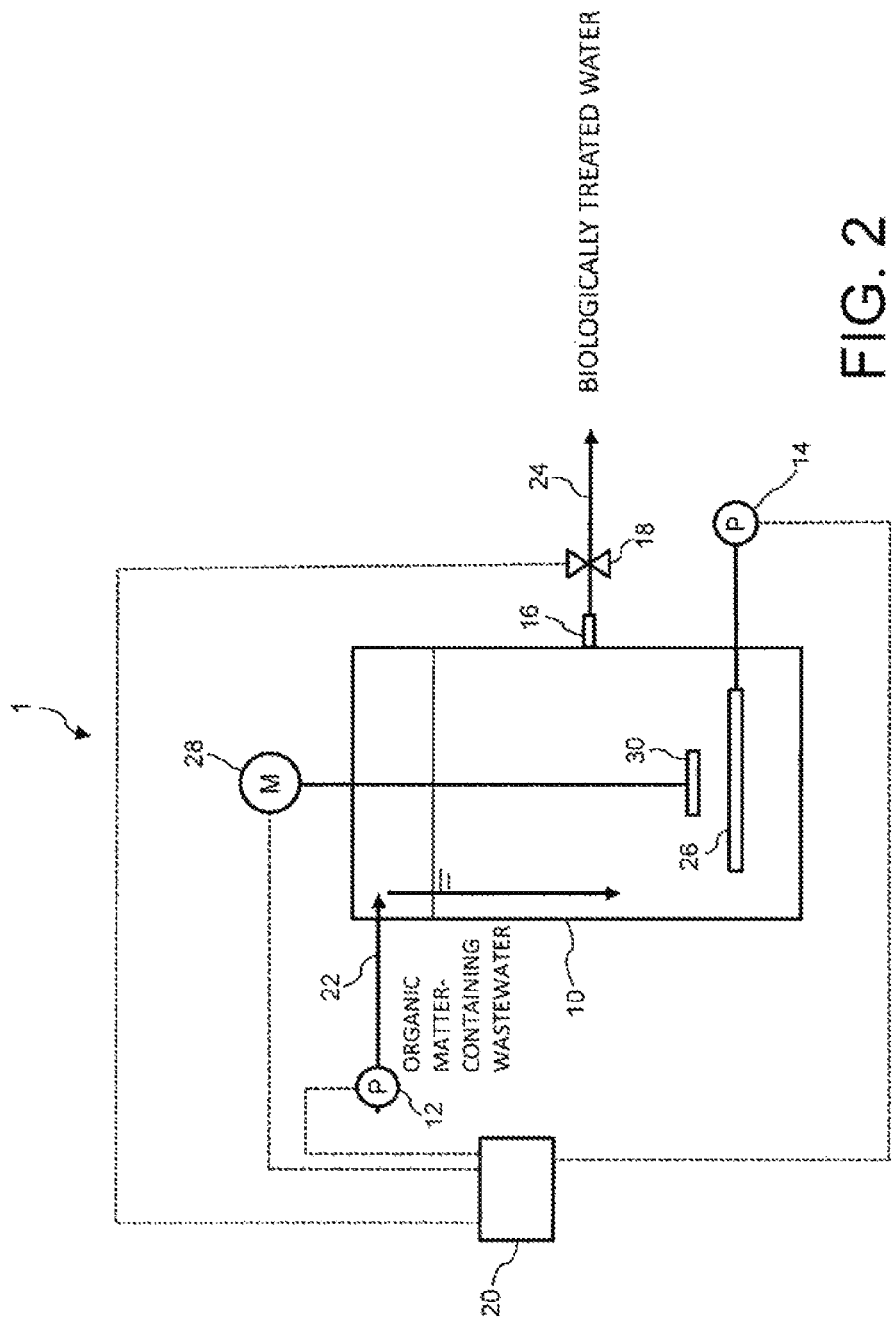
FIG. 2 is a schematic structural diagram illustrating another example of a granule-forming device according to an embodiment of the present invention.

The wastewater inlet pump 12 is stopped, an oxygen-containing gas such as air is supplied to the semi-batch reaction tank 10 from the aeration pump 14, and the treatment target substances in the organic matter-containing wastewater inside the semi-batch reactor 10 are biologically treated with a microbial sludge. The biological reactions are not limited to aerobic reactions, and anoxic reactions can also be performed by stirring the wastewater without supplying air or the like, or a combination of aerobic reactions and anoxic reactions may be used. An anoxic state refers to a state in which, although no dissolved oxygen exists, oxygen derived from nitrites or nitrates and the like is present. For example, as shown in FIG. 2, a stirring device composed of a motor 28, a stirring blade 30, and a shaft or the like that connects the motor 28 and the stirring blade 30 may be installed in the semi-batch reaction tank 10, and stirring may then be performed using the stirring device with the aeration pump 14 stopped. The stirring device is not limited to the configuration described above.

After the biological treatment step has been performed for a predetermined period of time, the aeration pump 14 is stopped, for example by the control device 20 (the stirring device is also stopped in the granule-forming device of FIG. 2).

<(3) Settling Step>

After the aeration pump 14 is stopped, the device is left to stand for a predetermined period of time to allow the sludge inside the semi-batch reactor 10 to settle.

<(4) Discharge Step>

By opening the biologically treated water discharge valve 18, the supernatant water obtained in the settling step is discharged from the biologically treated water outlet 16 through the biologically treated water line 24 as a biologically treated water. In this case, the biologically treated water may also be discharged using a pump instead of the biologically treated water discharge valve 18.

By repeating the operation cycle composed of (1) to (4) above, granules composed of granular aggregates of densely aggregated microbes are formed. The activation and stopping of the wastewater inlet pump 12, the aeration pump 14 and the stirring device motor 28, and the opening and closing of the biologically treated water discharge valve 18 may be controlled by the control device 20, or performed by an operator or the like.

<Sludge Load in Biological Treatment Step>

The biological treatment step of the present invention includes a case where the biological treatment step is performed at a first sludge load, and a case where the biological treatment step is performed at a second sludge load. That is, the present embodiment includes a first operation cycle having an introduction step, a biological treatment step for performing the biological treatment at the first sludge load, a settling step, and a discharge step, and a second operation cycle, performed following the first operation cycle, having an introduction step, a biological treatment step for performing the biological treatment at the second sludge load, a settling step, and a discharge step.

The first sludge load represents a sludge load that ensures that the soluble BOD concentration inside the semi-batch reaction tank 10 upon completion of the biological treatment step does not fall to a threshold value or below, or a sludge load that ensures that the ammoniacal nitrogen concentration inside the semi-batch reaction tank 10 upon completion of the biological treatment step does not fall to a threshold value or below. Further, the second sludge load represents a sludge load that ensures that the soluble BOD concentration inside the semi-batch reaction tank 10 upon completion of the biological treatment step does not exceed a threshold value, or a sludge load that ensures that the ammoniacal nitrogen concentration inside the semi-batch reaction tank upon completion of the biological treatment step does not exceed a threshold value.

The threshold is set to an organic matter concentration (soluble BOD concentration), which represents feed for microorganisms, at which the activity of the microorganisms decreases as a result of a reduction in the organic matter concentration (soluble BOD concentration) and the system entering a starved state. That is, in the region above the threshold, the system enters a satiated state having a high soluble BOD concentration, whereas in the region below the threshold, the system enters a starved state having a low soluble BOD concentration. The threshold for the first sludge load and the threshold for the second sludge load may be the same value, but in terms of adequately maintaining both the satiated state and the starved state, the thresholds may be set individually (first sludge load threshold>second sludge load threshold).

FIG. 3A is a diagram illustrating an example of the change over time in the soluble BOD concentration inside the tank during the first operation cycle and the second operation cycle, and FIG. 3B is a diagram illustrating the change over time in the soluble BOD concentration inside the tank during a conventional operation cycle. As shown in FIG. 3A, the soluble BOD concentration inside the tank rises at the start of the first operation cycle due to the introduction of the wastewater. As a result, the microorganisms inside the tank enter a satiated state having a high soluble BOD concentration. As the first operation cycle proceeds, the soluble BOD concentration inside the tank decreases due to the biological treatment step, but because the biological treatment is performed at the first sludge load mentioned above, the soluble BOD concentration inside the tank upon completion of the biological treatment step does not fall below the threshold, thereby maintaining the satiated state. Further, after completion of the first operation cycle, the soluble BOD concentration inside the tank rises at the start of the second operation cycle due to the introduction of the wastewater, and the satiated state having a high soluble BOD concentration is maintained inside the tank until partway through the biological treatment step. In the second operation cycle, because the biological treatment is performed at the second sludge load mentioned above, the soluble BOD concentration inside the tank upon completion of the biological treatment step does not exceed the threshold, and the system enters a starved state having a low soluble BOD concentration. As a result of repeating such operation cycles, switching between the satiated state and starved state is repeated, and granules having good settling properties are formed. In particular, because an adequate satiated state is readily maintained by the above operation cycles, granules having good settling properties can be formed even when the organic matter concentration in the wastewater is low. On the other hand, as shown in FIG. 3B, the conventional operation cycle requires that the satiated state and the starved state are created during a single cycle. Consequently, for example, when the organic matter concentration in the wastewater is low, the satiated state ends in a short period of time and an adequate satiated state cannot be maintained, thereby making the formation of granules having good settling properties difficult.

In the granule-forming method according to the present embodiment, the second operation cycle may be performed after repeating the first operation cycle multiple times. Further, the second operation cycle may be repeated multiple times after the first operation cycle. In addition, the second operation cycle may be repeated multiple times after the first operation cycle has been repeated multiple times. Moreover, an operation cycle having a sludge load lower than that of the first operation cycle but higher than that of the second cycle may be inserted between the first operation cycle and the second operation cycle.

In FIG. 3, although the change in the soluble BOD concentration inside the tank was described as an example, because ammoniacal nitrogen is also treated in the biological treatment when the organic matter is treated, the soluble BOD concentration may be substituted with the ammoniacal nitrogen concentration.

The first sludge load/second sludge load ratio is preferably set to two times or more, and more preferably set to three times or more. In this manner, by making the difference between the first sludge load and the second sludge load large, the satiated state can be maintained for a longer period of time, or the starved state can be maintained for a longer period of time.

The first sludge load in the first operation cycle is preferably a sludge load that ensures that the soluble BOD concentration inside the semi-batch reaction tank 10 upon completion of the biological treatment step does not fall to 5 mg/L or lower, more preferably does not fall to 10 mg/L or lower, and even more preferably does not fall to 25 mg/L or lower. Alternatively, the first sludge load in the first operation cycle is preferably a sludge load that ensures that the ammoniacal nitrogen concentration inside the semi-batch reaction tank 10 upon completion of the biological treatment step does not fall to 5 mgN/L or lower, more preferably does not fall to 10 mgN/L or lower, and even more preferably does not fall to 25 mgN/L or lower. As a result, the satiated state can be maintained for a longer period of time.

Although the first sludge load in the first operation cycle depends on the types of organic matter in the wastewater and the like, for example, a range of 0.4 to 2.0 kgBOD/kgMLSS/day is preferable, and a range of 0.6 to 1.5 kgBOD/kgMLSS/day is more preferable. Outside of the above ranges, it may sometimes become difficult to maintain the satiated state for a sufficient period of time.

The second sludge load in the second operation cycle is preferably a sludge load that ensures that the soluble BOD concentration inside the semi-batch reaction tank 10 upon completion of the biological treatment step does not exceed 5 mg/L, more preferably does not exceed 1 mg/L, and even more preferably does not exceed 0.5 mg/L. Alternatively, the second sludge load in the second operation cycle is preferably a sludge load that ensures that the ammoniacal nitrogen concentration inside the semi-batch reaction tank 10 upon completion of the biological treatment step does not exceed 5 mgN/L, more preferably does not exceed 1 mgN/L, and even more preferably does not exceed 0.5 mgN/L. As a result, the starved state can be maintained for a longer period of time.

Although the second sludge load in the second operation cycle depends on the types of organic matter in the wastewater and the like, for example, a range of 0.02 to 0.3 kgBOD/kgMLSS/day is preferable, and a range of 0.05 to 0.2 kgBOD/kgMLSS/day is more preferable. Outside of the above ranges, it may sometimes become difficult to maintain the starved state for a sufficient period of time.

The first sludge load and the second sludge load are set, for example, by adjusting the biological treatment step time. For example, if the length of time taken for the soluble BOD concentration inside the tank to fall to the threshold is measured during preliminary testing and device initialization and the like, and the biological treatment step time is then set to be shorter than the measured length of time, the sludge load at that time becomes the first sludge load, whereas if the biological treatment step time is set to be longer than the measured length of time, the sludge load at that time becomes the second sludge load. The soluble BOD concentration inside the semi-batch reaction tank 10 is determined by measuring a filtrate obtained upon filtration according to the method prescribed in JIS K0102 and the like. The sludge load (kgBOD/kgMLSS/day) is calculated from the amount of BOD supplied to the semi-batch reaction tank 10 per day (kgBOD/day) and the amount of MLSS inside the semi-batch reaction tank 10 (kgMLSS).

The dissolved oxygen (DO) inside the semi-batch reaction tank 10, under aerobic conditions, is at least 0.5 mg/L, and a concentration of at least 1 mg/L is particularly preferable.

In terms of promoting the granulation of the biological sludge, ions that form hydroxides, such as $Fe^{2+}$, $Fe^{3+}$, $Ca^{2+}$, and $Mg^{2+}$ are preferably added to the organic matter-containing wastewater inside the semi-batch reaction tank 10, or to the organic matter-containing wastewater prior to introduction into the semi-batch reaction tank 10. Most typical organic matter-containing wastewaters include microparticles that can act as nuclei for granules, but the addition of the ions above can further promote the nucleation of granules.

The organic matter-containing wastewater that represents the treatment target of the granule-forming method according to the present embodiment is an organic wastewater containing biodegradable organic matter, such as a food processing plant wastewater, a chemical plant wastewater, a semiconductor plant wastewater, a machinery plant wastewater, sewage, or human waste. Further, when the wastewater contains organic matter that is resistant to biodegradation, the organic matter can be converted to biodegradable substances and thus a treatable target by performing a physicochemical treatment such as an ozone treatment or a Fenton treatment in advance. In addition, although the granule-forming method according to the present invention may be used against a variety of BOD components, oils and fats may have an adverse effect by adhering to the sludge and the granules, and therefore it is preferable that prior to introduction into the semi-batch reaction tank 10, a known technique such as flotation separation, flocculation pressure flotation, or adsorption is performed in advance to remove the oils and fats, for example, down to a level of approximately 150 mg/L or less.

The BOD concentration in the organic matter-containing wastewater representing the treatment target is not particularly limited, but the granule-forming method according to the present invention enables the formation of granules having good settling properties even at a low concentration of 50 to 200 mg/L, which is considered to be a concentration at which formation of granules is difficult.

The granule-forming method according to the present embodiment enables the formation, for example, of granules having a SVI30 of 50 mL/g or less, and a SVI5 of 70 mL/g or less, wherein these values are indicators of the settling properties.

Figure 4:
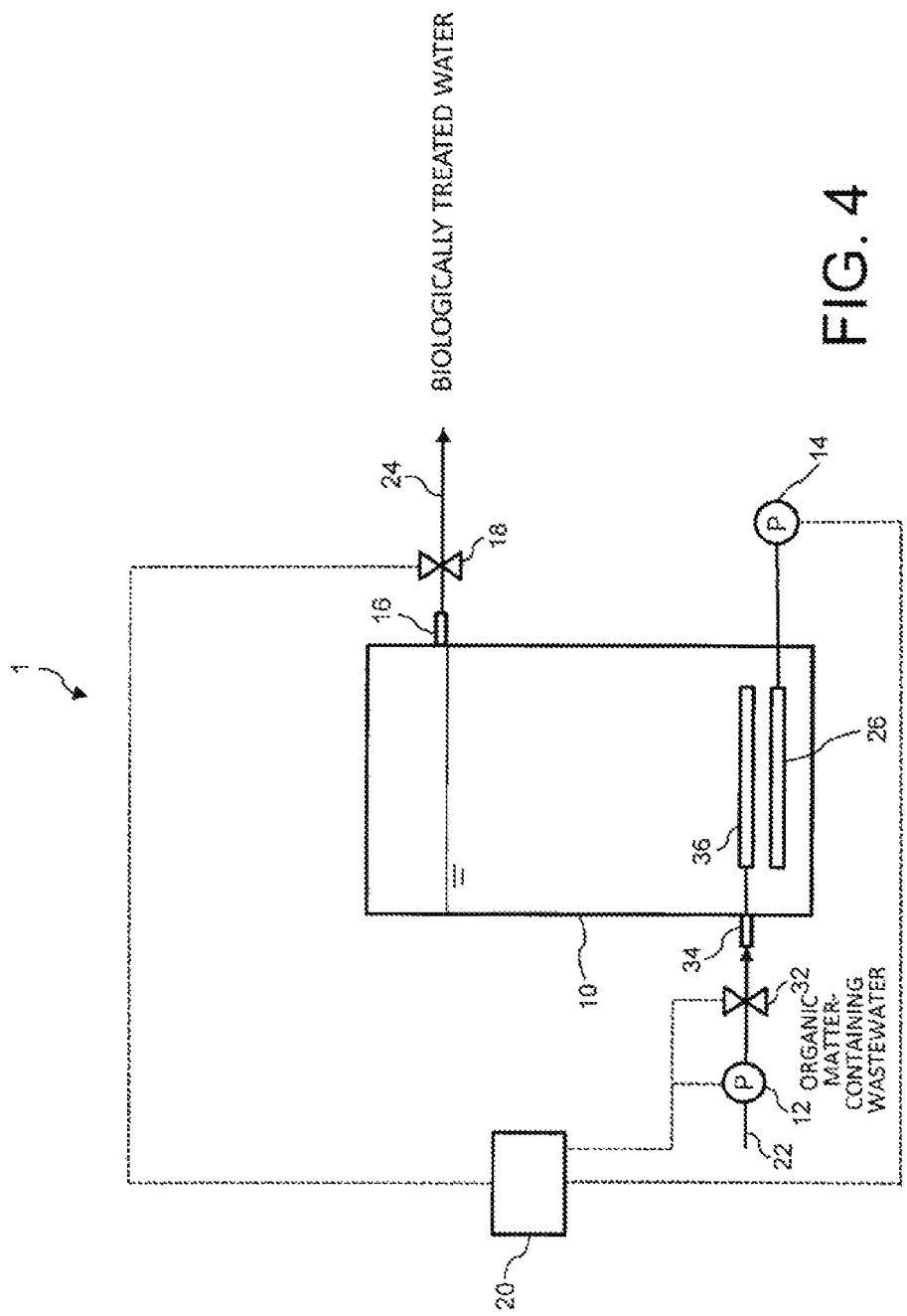
FIG. 4 is a schematic structural diagram illustrating another example of a granule-forming device according to an embodiment of the present invention.

Another example of a granule-forming device according to the present embodiment is shown in FIG. 4. In the granule-forming device 1 shown in FIG. 4, the wastewater supply line 22 is connected to a wastewater inlet 34 in the lower portion of the semi-batch reaction tank 10 via the wastewater inlet pump 12 and the wastewater inlet valve 32. A wastewater discharge unit 36 is connected to the wastewater inlet 34, and is installed in the lower portion inside the semi-batch reaction tank 10. The biologically treated water outlet 16 of the semi-batch reaction tank 10 is provided above the wastewater inlet 34, and the biologically treated water line 24 is connected to the biologically treated water outlet 16 via the biologically treated water discharge valve 18. Although the biologically treated water outlet 16 is provided above the wastewater inlet 34, and in order to prevent short-cutting of the introduced organic matter-containing wastewater and enable more efficient formation of the granules, is preferably installed as distant as possible from the wastewater inlet 34, and is more preferably installed at the water level in the settling step. The wastewater inlet pump 12, the wastewater inlet valve 32, the biologically treated water discharge valve 18, and the aeration pump 14 are each electrically connected to the control device 20. The remaining configuration is the same as that of the granule-forming device 1 of FIG. 1.

In the granule-forming device 1 of FIG. 4, granules are formed by repeating an operation cycle consisting of (1) an introduction step/discharge step, (2) a biological treatment step, and (3) a settling step.

(1) The introduction step/discharge step is a process in which the discharge step is carried out while performing the introduction step, and more specifically, by opening the wastewater inlet valve 32 and activating the wastewater inlet pump 12 to introduce organic matter-containing wastewater from the wastewater inlet 34, through the wastewater supply line 22, and then out from the wastewater discharge unit 36 and into the semi-batch reaction tank 10, the biologically treated water is discharged from the biologically treated water outlet 16 through the biologically treated water line 24. (2) The biological treatment step and (3) the settling step are performed as described above. The activation and stopping of the wastewater inlet pump 12 and the aeration pump 14, and the opening and closing of the wastewater inlet valve 32 and the biologically treated water discharge valve 18 may be controlled by the control device 20, or performed by an operator or the like.

In the granule-forming device 1 of FIG. 4, because the biologically treated water is discharged from the biologically treated water outlet 16 by introducing organic matter-containing wastewater into the semi-batch reaction tank 10, granules having comparatively small particle sizes are discharged with the biologically treated water, whereas the operation cycle of (1) to (3) is repeated for granules having comparatively large particle sizes. As a result, granules having good settling properties can be more efficiently formed.

Figure 5:
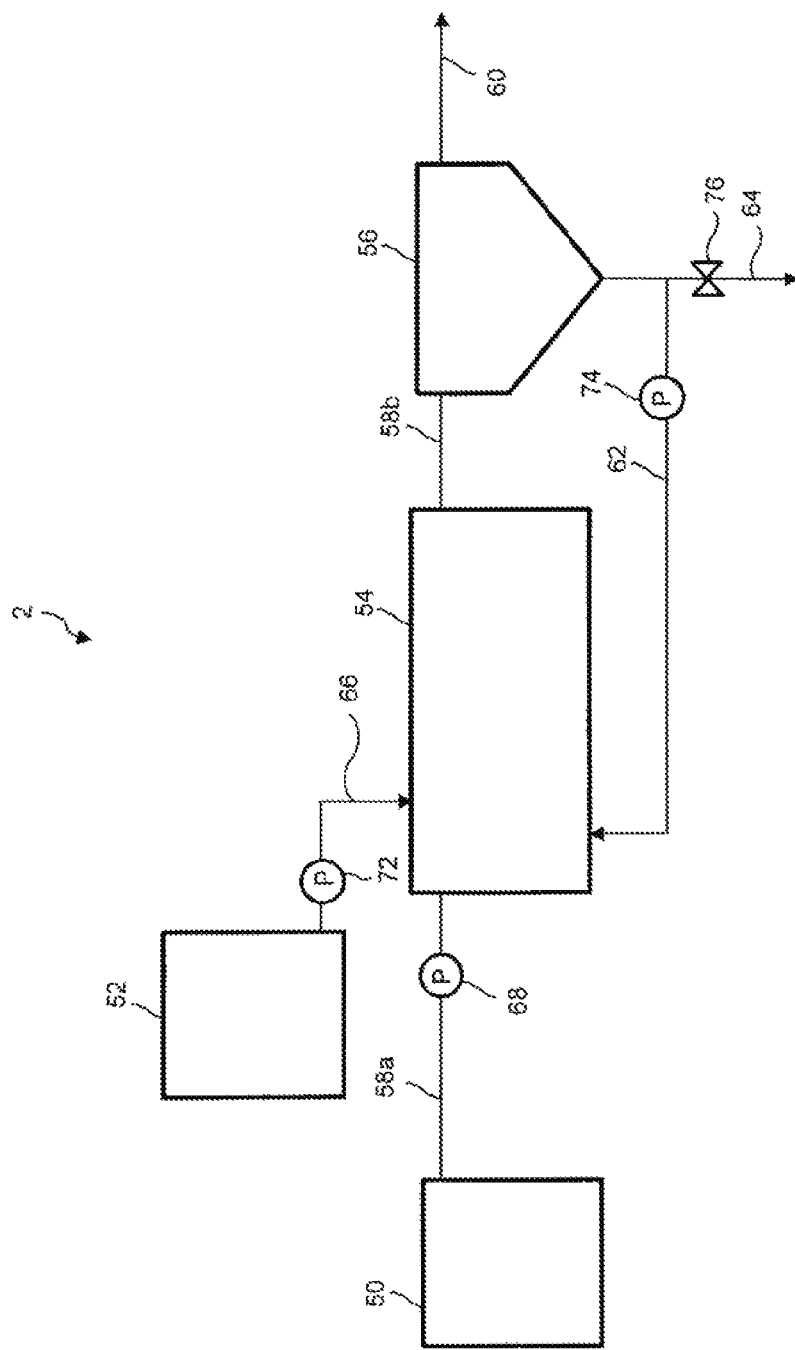
FIG. 5 is a schematic structural diagram illustrating a wastewater treatment device according to an embodiment of the present invention.

FIG. 5 is a schematic structural diagram of a wastewater treatment device according to an embodiment of the present invention. The wastewater treatment device 2 shown in FIG. 5 includes a wastewater storage tank 50, a granule-forming device 52, a continuous biological treatment tank 54, and a solid-liquid separation tank 56.

The wastewater treatment device 2 shown in FIG. 5 includes wastewater inlet lines 58a and 58b, a treated water discharge line 60, a sludge return line 62, a sludge discharge line 64, and a granule supply line 66. A wastewater inlet pump 68 is installed in the wastewater inlet line 58a, a granule supply pump 72 is installed in the granule supply line 66, and a sludge return pump 74 is installed in the sludge return line 62.

One end of the wastewater inlet line 58a is connected to a wastewater outlet of the wastewater storage tank 50, and the other end is connected to a wastewater inlet of the continuous biological treatment tank 54. Further, one end of the wastewater inlet line 58b is connected to a wastewater outlet of the continuous biological treatment tank 54, and the other end is connected to a wastewater inlet of the solid-liquid separation tank 56. The treated water discharge line 60 is connected to a treated water outlet of the solid-liquid separation tank 56. One end of the sludge return line 62 is connected to a sludge outlet of the solid-liquid separation tank 56, and the other end is connected to a sludge inlet of the continuous biological treatment tank 54. The sludge discharge line 64 is connected to the sludge return line 62. One end of the granule supply line 66 is connected to a sludge outlet of the granule-forming device 52, and the other end is connected to a sludge supply port of the continuous biological treatment tank 54.

The continuous biological treatment tank 54 shown in FIG. 5, for example, performs biological treatment of a continuously introduced wastewater (for example, oxidizes the organic matter in the wastewater to form carbon dioxide) under aerobic conditions and in the presence of a biological sludge such as granules supplied from the granule-forming device 52.

The solid-liquid separation tank 56 shown in FIG. 5 is a separation device for separating the biological sludge and the treated water from the biological sludge-containing water, and examples include separation devices that employ settling separation, pressure flotation, filtration, or membrane separation or the like.

The granule-forming device 52 shown in FIG. 5 represents the granule-forming devices exemplified in FIGS. 1, 2, and 4.

An example of the operation of the wastewater treatment device 2 shown in FIG. 5 is described below.

The organic matter-containing wastewater that represents the treatment target is a wastewater containing biodegradable organic matter, such as a food processing plant wastewater, a chemical plant wastewater, a semiconductor plant wastewater, a machinery plant wastewater, sewage, or human waste. When the wastewater contains organic matter that is resistant to biodegradation, it is desirable to convert the organic matter to biodegradable substances by performing a physicochemical treatment beforehand.

The organic matter-containing wastewater is preferably delivered to the wastewater storage tank 50 for water quality stabilization of the wastewater prior to being supplied to the continuous biological treatment tank 54. The wastewater storage tank 50 may be omitted when the water quality of the wastewater is comparatively stable, or when the wastewater introduction rate is high. Further, when the wastewater contains solid matter, it is preferable for the solid matter to be removed beforehand by using a screen or a settling pond or the like before the wastewater is supplied to the wastewater storage tank 50.

The treatment target wastewater inside the wastewater storage tank 50 is supplied to the continuous biological treatment tank 54 from the wastewater inlet line 58a by activating the wastewater inlet pump 68. The treatment target wastewater inside the wastewater storage tank 50 may be supplied to the granule-forming device 52. The operation cycle described above is repeatedly performed in the granule-forming device 52, resulting in the formation of granules. The granules formed inside the granule-forming device 52 are supplied to the continuous biological treatment tank 54 from the granule supply line 66 by activating the granule supply pump 72.

The supply of the granules from the granule-forming device 52 may be performed (2) during the biological treatment step, (3) during the settling step, or (4) during the discharge step (or the introduction step/discharge step). It is desirable that the granules supplied from the granule-forming device 52 to the continuous biological treatment tank 54 contain granules having a SVI30 of 50 mL/g or less and a SVI5 of 70 mL/g or less, wherein these values are indicators of the settling properties. For example, by periodically measuring the SVI values of the sludge inside the granule-forming device 52 by performing a settling properties test, supply of the granules to the continuous biological treatment tank 54 may be started at a stage where the SVI5, which is calculated from a volume fraction after allowing settling for 5 minutes falls to a predetermined value or less (for example, 70 mL/g or less).

In the continuous biological treatment tank 54, for example, biological treatment of the organic matter-containing wastewater is performed under aerobic conditions using a biological sludge containing the granules described above. After treatment in the continuous biological treatment tank 54, the treated water is supplied to the solid-liquid separation tank 56 from the wastewater inlet line 58b, and the biological sludge is separated from the treated water. The sludge obtained from the solid-liquid separation is returned to the continuous biological treatment tank 54 from the sludge return line 62 by activating the sludge return pump 74. Further, the sludge obtained from the solid-liquid separation may be discharged outside the system from the sludge discharge line 64 by opening the valve 76. In addition, the treated water inside the solid-liquid separation tank 56 is discharged outside the system from the treated water discharge line 60.

According to the wastewater treatment device 2 of the present embodiment, because granules having good settling properties are supplied to the continuous biological treatment tank 54 by the granule-forming device 52, an efficient biological treatment of the organic-matter containing wastewater can be performed in the continuous biological treatment tank 54.

EXAMPLES

The following testing was performed using the semi-batch reaction tank shown in FIG. 4 (reaction tank effective volume: 1.4 $m^3$ (length 683 mm×width 683 mm×height 3,000 mm)). In the semi-batch reaction tank, the biologically treated water outlet was installed at the position of the water level in the settling step.

A water flow test was performed using sewage. The BOD concentration of the sewage was 80 to 140 mg/L. The BOD concentration of the wastewater was measured according to JIS K 0102 21.

The operation cycle of the semi-batch reaction tank was performed as follows. An activated sludge collected from a sewage treatment plant was placed in the semi-batch reaction tank as a seed sludge before operation.

(1) Introduction/discharge step: the wastewater was introduced to the semi-batch reaction tank over a predetermined period of time, and the biologically treated water was also discharged from the biologically treated water outlet.

(2) Biological treatment step: at the same time introduction of the wastewater and discharging of the biologically treated water were stopped, air was supplied by the aeration device installed in the lower portion of the reaction tank, and biological treatment of the wastewater was performed for a predetermined period of time. After this period of time had elapsed, the operation shifted to the settling step below.

(3) Settling step: the supply of air from the aeration device was stopped, and the system was left to stand for a predetermined period of time, allowing the sludge inside the reaction tank to settle.

The above operations (1) to (3) were performed repeatedly.

Comparative Example 1

Day 0 to Day 15 of Operation

From day 0 to day 15 of operation, an operation cycle consisting of an introduction/discharge step time of 90 minutes, a biological treatment step time of 200 minutes, and a settling step time of 8 minutes was repeated. The sludge load during the biological treatment step was 0.24 kgBOD/kgMLSS/day. Further, during day 0 to day 15 of operation, upon performing biological treatment using the above sludge load, the soluble BOD concentration inside the tank upon completion of the biological treatment step was 1 mg/L or less, and the ammoniacal nitrogen concentration was 0.5 mg/L or less.

Comparative Example 2

Day 16 to Day 50 of Operation

From day 16 to day 50 of operation, an operation cycle consisting of an introduction/discharge step time of 90 minutes, a biological treatment step time of 150 minutes, and a settling step time of 8 minutes was repeated. The sludge load during the biological treatment step was 0.3 kgBOD/kgMLSS/day. Further, during day 16 to day 50 of operation, upon performing biological treatment using the above sludge load, the soluble BOD concentration inside the tank upon completion of the biological treatment step was 1 mg/L or less, and the ammoniacal nitrogen concentration was 0.5 mg/L or less.

Example

Day 51 to Day 78 of Operation

From day 51 to day 78 of operation, a first operation cycle consisting of an introduction/discharge step time of 90 minutes, a biological treatment step time of 40 minutes and a settling step time of 8 minutes, and a second operation cycle consisting of an introduction/discharge step time of 90 minutes, a biological treatment step time of 240 minutes and a settling step time of 8 minutes were repeated alternately. The sludge load during the biological treatment step in the first operation cycle was 1.3 kgBOD/kgMLSS/day, while the soluble BOD concentration inside the tank upon completion of the biological treatment step was 10 mg/L or higher, and the ammoniacal nitrogen concentration was 10 mg/L or higher. The sludge load during the biological treatment step in the second operation cycle was 0.2 kgBOD/kgMLSS/day, while the soluble BOD concentration inside the tank upon completion of the biological treatment step was 1 mg/L or less, and the ammoniacal nitrogen concentration was 0.5 mg/L or less.

An SVI measurement of the biological sludge inside the tank was performed in the Example and in Comparative Examples 1 and 2. The SVI is an indicator of the settling properties of a biological sludge, and is determined according to the following method. Firstly, 1 L of the sludge is placed in a 1 L graduated cylinder, and after gently stirring the sludge such that the sludge concentration becomes as uniform as possible, the sludge interface is measured after being left to stand for 5 minutes, and then after 30 minutes. The volume fraction (%) occupied by the sludge in the graduated cylinder is then calculated. Next, the MLSS (mg/L) of the sludge is measured. These values are substituted into the following equation to calculate a SVI5 and a SVI30.

$$SVI(mL/g) = \text{volume fraction occupied by sludge} \times 10,000/MLSS$$

Figure 6:
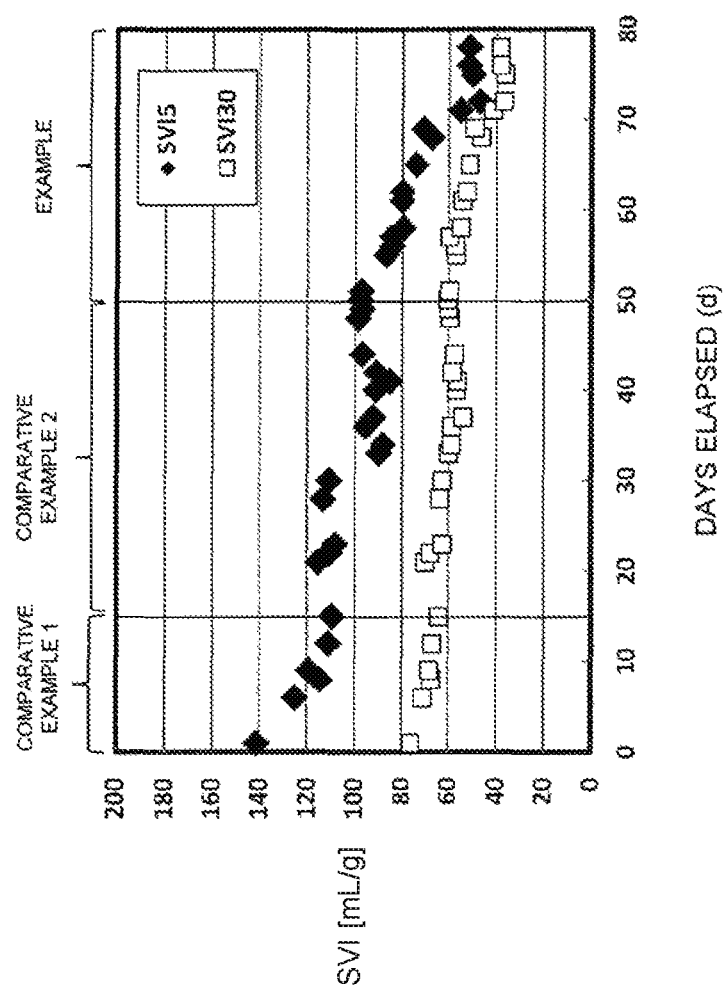
FIG. 6 is a diagram illustrating a change over time in SVI5 and SVI30 in Comparative Examples 1 and 2 and the Example.

FIG. 6 shows the change over time in the SVI5 and the SVI30 in Comparative Examples 1 and 2 and the Example.

Comparative Example 1

Day 0 to Day 15 of Operation

On day 0 of operation, the SVI5 was 141 mL/g and the SVI30 was 76 mL/g, but a decrease in the SVI values was confirmed with the passage of the number of days of operation, and the SVI5 was 114 mL/g and the SVI30 was 67 mL/g on day 8 of water flow. Thereafter, the SVI5 became stagnant at approximately 110 mL/g.

Comparative Example 2

Day 16 to Day 50 of Operation

From day 16 of operation onwards, as a result of performing the operation with a higher sludge load during the biological treatment step, the SVI5 remained stagnant at approximately 110 to 115 mL/g until day 30 of operation, but on day 33 of water flow, the SVI5 decreased to 90 mL/g. Thereafter, the SVI became stagnant such that on day 50 the SVI5 was 98 mL/g, and the SVI30 was 60 mL/g.

Example

Day 51 to 78 of Operation

From day 51 of operation onwards, as a result of performing the operation by alternatingly repeating the operation cycle in which the biological treatment was performed at a sludge load of 1.3 kgBOD/kgMLSS/day, and the operation cycle in which the biological treatment was performed at a sludge load of 0.2 kgBOD/kgMLSS/day, the SVI values decreased with the passage of the number of days of operation such that the SVI5 was 47 mL/g and the SVI30 was 37 mL/g on day 72. Thereafter, the SVI5 stabilized at approximately 50 mL/g, and the SVI30 stabilized at approximately 38 mL/g.

Although a decrease in the SVI was observed in both the Example and the Comparative Examples, the Example resulted in a lower value. In other words, it can be stated that granules having better settling properties were formed in the Example.

REFERENCE SIGNS LIST

1: Granule-forming device
2: Wastewater treatment device
10: Semi-batch reaction tank
12: Wastewater inlet pump 14: Aeration pump
16: Biologically treated water outlet
18: Biologically treated water discharge valve
20: Control device
22: Wastewater supply line
24: Biologically treated water line
26: Aeration device
28: Motor
30: Stirring blade
32: Wastewater inlet valve
34: Wastewater inlet
36: Wastewater discharge unit
50: Wastewater storage tank
52: Granule-forming device
54: Continuous biological treatment tank
56: Solid-liquid separation tank
58a, 58b: Wastewater inlet line
60: Treated water discharge line
62: Sludge return line
64: Sludge discharge line
66: Granule supply line
68: Wastewater inlet pump
72: Granule supply pump
74: Sludge return pump
76: Valve

The invention claimed is:

1. A granule-forming method using a semi-batch reaction tank, the method comprising forming granules by repeatedly performing an operation cycle having an introduction step of introducing an organic matter-containing wastewater, a biological treatment step of biologically treating treatment target substances in the organic matter-containing wastewater by using a microbiological sludge, a settling step of allowing the microbiological sludge to settle, and a discharge step of discharging a biologically treated water that has been biologically treated, wherein
the operation cycle includes a first operation cycle for performing the biological treatment step at a first sludge load, and a second operation cycle, performed after the first operation cycle, for performing the biological treatment step at a second sludge load, and
the first sludge load is set such that a soluble BOD concentration inside the semi-batch reaction tank upon completion of the biological treatment step of the first operation cycle does not fall to a threshold value or below, and the second sludge load is set such that a soluble BOD concentration inside the semi-batch reaction tank upon completion of the biological treatment step of the second operation cycle does not exceed a threshold value.

2. The granule-forming method according to claim 1, wherein a first sludge load/second sludge load ratio is two times or more.

3. The granule-forming method according to claim 1, wherein
the second sludge load is set such that an ammoniacal nitrogen concentration inside the semi-batch reaction tank upon completion of the biological treatment step of the second operation cycle is 1 mgN/L or less.

4. The granule-forming method according to claim 1, wherein
a biologically treated water outlet of the semi-batch reaction tank is provided above a wastewater inlet, and the biologically treated water is discharged from the treated water outlet by introducing the organic matter-containing wastewater into the semi-batch reaction tank from the wastewater inlet.

5. The granule-forming method according to claim 1, the method further comprising supplying the granule to a continuous biological treatment tank.

6. The granule-forming method according to claim 2, wherein
the second sludge load is set such that an ammoniacal nitrogen concentration inside the semi-batch reaction tank upon completion of the biological treatment step of the second operation cycle is 1 mgN/L or less.

7. The granule-forming method according to claim 2, wherein
a biologically treated water outlet of the semi-batch reaction tank is provided above a wastewater inlet, and the biologically treated water is discharged from the treated water outlet by introducing the organic matter-containing wastewater into the semi-batch reaction tank from the wastewater inlet.

8. The granule-forming method according to claim 3, wherein
a biologically treated water outlet of the semi-batch reaction tank is provided above a wastewater inlet, and the biologically treated water is discharged from the treated water outlet by introducing the organic matter-containing wastewater into the semi-batch reaction tank from the wastewater inlet.

* * * * *